United States Patent
Komatsu et al.

(10) Patent No.: US 7,439,454 B2
(45) Date of Patent: Oct. 21, 2008

(54) ARTICLE TRANSPORT APPARATUS HAVING TROUGH AND RECIPROCATING MOVEMENT MECHANISM, AND COMBINATION WEIGHING APPARATUS PROVIDED THEREWITH

(75) Inventors: Toshiyuki Komatsu, Nara (JP); Yukio Wakasa, Takatsuki (JP)

(73) Assignee: Ishida Co., Ltd., Kyoto (JP)

( * ) Notice: Subject to any disclaimer, the term of this patent is extended or adjusted under 35 U.S.C. 154(b) by 83 days.

(21) Appl. No.: 10/561,388

(22) PCT Filed: Mar. 11, 2005

(86) PCT No.: PCT/JP2005/004353

§ 371 (c)(1),
(2), (4) Date: Dec. 19, 2005

(87) PCT Pub. No.: WO2005/092748

PCT Pub. Date: Oct. 6, 2005

(65) Prior Publication Data

US 2007/0095579 A1    May 3, 2007

(30) Foreign Application Priority Data

Mar. 26, 2004    (JP) ............................. 2004-092213

(51) Int. Cl.
*B65G 27/08*    (2006.01)
*G01G 19/387*    (2006.01)

(52) U.S. Cl. .................... 177/25.18; 177/119; 177/126; 198/763

(58) Field of Classification Search ................. 198/758, 198/759, 763; 177/25.18, 126, 119
See application file for complete search history.

(56) References Cited

U.S. PATENT DOCUMENTS

| 4,593,603 A | * | 6/1986 | Johnson ........................ 91/265 |
| 4,962,896 A | * | 10/1990 | Robinson ...................... 241/266 |
| 5,445,261 A | * | 8/1995 | Kimura ........................ 198/763 |
| 5,467,859 A | * | 11/1995 | Sahlberg ...................... 198/750.7 |
| 5,704,466 A | * | 1/1998 | Mosher ....................... 198/771 |

FOREIGN PATENT DOCUMENTS

| JP | 50-21274 Y1 | * | 6/1975 |
| JP | 57-175612 A | | 10/1982 |
| JP | 57-175612 A | * | 10/1982 |
| JP | 6-45857 Y2 | | 11/1994 |
| JP | 07-285637 A | | 10/1995 |
| JP | 2000-506482 A | | 5/2000 |
| JP | 2005-693778 | * | 10/2005 |
| JP | 2006-273494 | * | 10/2006 |
| WO | WO-9733818 | | 9/1997 |

* cited by examiner

*Primary Examiner*—Randy W Gibson
(74) *Attorney, Agent, or Firm*—Global IP Counselors, LLP (57) ABSTRACT

A transport apparatus that enables a trough to be easily removed in one step, and a combination weighing apparatus provided with the same are provided. The transport apparatus includes a trough and a reciprocating movement mechanism, and is configured to convey an article placed in the trough in a predetermined direction. The reciprocating movement mechanism includes a motor box, and a support member. The trough has one of a protruding part and a depressed part, while the support member had the other of the protruding part and the depressed part. The motor is configured to move the trough via the support member along the conveyance direction such that the trough moves faster in a direction opposite the conveyance direction than in the conveyance direction. The protruding part is removably connected to the depressed part.

15 Claims, 12 Drawing Sheets

ARTICLE TRANSPORT APPARATUS HAVING TROUGH AND RECIPROCATING MOVEMENT MECHANISM, AND COMBINATION WEIGHING APPARATUS PROVIDED THEREWITH

FIELD OF THE INVENTION

The present invention relates to a transport apparatus which conveys articles placed in a trough in a predetermined direction and a combination weighing apparatus provided therewith.

BACKGROUND OF THE INVENTION

Conventionally, it has been provided a transport apparatus that conveys an article placed in a trough. An example of such a transport apparatus includes an electromagnetic feeder (refer to Patent Document 1).

The electromagnetic feeder disclosed in Patent Document 1 conveys an article placed in a trough by vibrating the trough with an electromagnet in the direction of the vector summation of the vertical direction and the conveyance direction. Also, this electromagnetic feeder is configured such that the trough can be removed for the purpose of cleaning and the like.

However, the conventional transport apparatus disclosed in the above patent document has a following problem.

Specifically, the transport apparatus disclosed in the above patent document employs a mechanism, which uses an electromagnet to provide great acceleration that exceeds the gravity acceleration in the direction of the vector summation of the vertical direction and the conveyance direction in order to vibrate the trough. Therefore, in order to reliably transmit vibration to an article to be conveyed, the apparatus is provided with a lock mechanism to rigidly secure the trough so that the trough does not become detached from a support member.

Consequently, removal of the trough of the conventional transport apparatus mentioned above requires at least two steps, i.e., releasing the lock mechanism and removing the trough. Therefore, removal of the trough is far from easy.

Therefore, it is an object of the present invention to provide a transport apparatus which enables a trough to be easily removed in one step, and a combination weighing apparatus provided with the transport apparatus.

<Patent Document 1>
Japanese Laid-open Patent Application No. H7-285637 (Published on Oct. 31, 1995)
<Patent Document 2>
Japanese Published Patent Application No. 2000-506482 (Published on May 30, 2000)

SUMMARY OF THE INVENTION

The transport apparatus according to the first aspect of the present invention comprises a trough, a reciprocating movement mechanism, and a protruding part. An article to be conveyed is placed in the trough. The reciprocating movement mechanism reciprocating moves the trough in the conveyance direction of the article. In addition, the reciprocating movement mechanism performs reciprocating movement such that rearward movement is faster than forward movement. The protruding part is a member that protrudes from the trough. In addition, the reciprocating movement mechanism includes a support member having a depressed part, which supports the protruding part. Further, the protruding part protruding from the trough and the depressed part of the support member are removable connected to each other.

Here, the transport apparatus that employs the reciprocating movement mechanism is provided with the support member, which supports the protruding part that protrudes from the trough. Moreover, this support member has the depressed part and supports the protruding part of the trough at this depressed part.

Note that a conventional transport apparatus such as an electromagnetic feeder imposes a large, accelerated velocity, for example, substantially ten times as large as the acceleration of gravity, upon a trough in the direction of the vector summation of the vertical direction and the conveyance direction. By doing so, such a transport apparatus vibrates the trough to convey an article. Consequently, in order to reliably transmit such vibration to the trough, the trough needs to be rigidly secured by a support member especially in the direction of the vector summation mentioned above. In particular, in the case where the center of gravity of the trough with an article placed therein is deviated from a position at which vibration is provided, if the trough is not rigidly secured in the direction of the vector summation mentioned above, it is highly possible for the trough to become detached from the support member.

On the contrary, the transport apparatus of the present invention does not employ the conveyance method that conveys an article by vibrating a trough in the vertical direction. Instead, in order to perform conveyance, the transport apparatus of the present invention employs a fastback conveyance method, which conveys an article by reciprocating moving a trough in the conveyance direction with a parallel link. Therefore, in comparison to the above-mentioned transport apparatus such as an electromagnetic feeder, the accelerated velocity in the vertical direction imposed upon the trough of the transport apparatus is small. Further, with the fastback conveyance method, it is possible to impose a force from a support member upon the trough with an article placed therein at a position close to the center of gravity of the trough. Consequently, unlike a transport apparatus such as an electromagnetic feeder that conveys an article by imposing a large, accelerated velocity upon the trough in the vertical direction, a transport apparatus that employs the reciprocating movement mechanism makes it unnecessary for the trough to be rigidly secured in the vertical direction by the support member.

Consequently, the transport apparatus of the present invention employs the reciprocating movement mechanism, and supports the trough by the support member having the depressed part, which does not substantially suppress the displacement of the trough in the vertical direction. As a result, when removing the trough, unlike a transport apparatus such as an electromagnetic feeder, it is not necessary to release a locking mechanism, and thus the trough can be easily removed in one step.

The transport apparatus according to the second aspect is the transport apparatus of the first aspect of the present invention, wherein the support member is configured such that the depressed part thereof faces vertically upward.

Here, since the trough is supported simply by placing the protruding part of the trough in the depressed part of the support member, the trough can be removed significantly easily. It should be noted that, with the reciprocating movement mechanism, accelerated velocity upon the trough in the vertical direction is small, so that a problem such as the trough becoming detached from the support member does not occur even though the protruding part of the trough is simply placed in the depressed part of the support member.

The transport apparatus according to the third aspect is the transport apparatus of the first aspect of the present invention, wherein the transport apparatus includes a plurality of support members, and at least one of these support members has a depressed part that faces horizontally.

Here, at least one support member has the depressed part that faces horizontally, so that displacement of the trough in the vertical direction can be controlled. Therefore, the trough of this transport apparatus can be reciprocating moved in a stable manner in comparison to a transport apparatus whose all depressed parts face vertically upward.

The transport apparatus according to the fourth aspect is the transport apparatus according to the third aspect of the present invention, wherein the support member having the depressed part that faces horizontally is a support member disposed rearward in the conveyance direction of an article, and an opening side of the depressed part is configured so as to face in the conveyance direction of the article.

Here, with the transport apparatus that employs the fastback conveyance method, since the support member disposed rearward in the conveyance direction of an article faces horizontally, movement of the trough in the vertical direction can be reliably controlled.

The transport apparatus according to the fifth aspect is the transport apparatus of any one of the first aspect through the fourth aspect of the present invention, wherein the support member is provided on both lateral sides of the trough.

Here, by supporting the trough at both sides, the trough can be stably supported, and the trough can also be easily removed.

The transport apparatus according to the sixth aspect is the transport apparatus of any one of the first aspect through the fourth aspect of the present invention, wherein the support member is provided only at one lateral side of the trough.

Here, by cantilever-supporting the trough, the structure can be simplified and the trough can be easily removed. It should be noted that since conveyance is conducted using the fastback conveyance method in which accelerated velocity in the vertical direction is small, the trough can be sufficiently supported even with a cantilever supporting.

The transport apparatus according to the seventh aspect is the transport apparatus of any one of the first aspect through the sixth aspect of the present invention, wherein the support member supports the trough at a position toward the back of the trough.

Typically, with the conveyance method that employs the fastback conveyance method, the front edge of the trough is disposed above a downstream device that receives an article from the trough. Consequently, a trough usually often protrudes further than a drive mechanism in limited space. Therefore, by positioning the support member at a position toward the back of the trough, an article can be conveyed to a downstream device.

A combination weighing apparatus according to the eighth aspect includes the transport apparatus according to any one of the first aspect through the seventh aspect of the present invention.

Here, since the combination weighing apparatus is provided with the transport apparatus of the present invention, it is possible to provide the combination weighing apparatus that achieves all the effects that can be attained by the aforementioned transport apparatus, including an easy removal of the trough that can be conducted in one step.

| DESCRIPTION OF THE REFERENCE SYMBOLS | |
|---|---|
| 10 | Transport apparatus |
| 11 | Trough |
| 11a, 11b | Protruding part |
| 12 | Motor box |
| 13 | Parallel link |
| 13a | First link (support member) |
| 13b | Second link (support member) |
| 13c | Third link |
| 14 | Rotation motor (rotary drive source) |
| 14a | Circular member |
| 14b | Protruding part |
| 15a | First depressed part |
| 15aa | Depressed part |
| 15ab | Depressed part |
| 15b | Second depressed part |
| 15ba | Depressed part |
| 15bb | Depressed part |
| 16 | Linking member |
| 20 | Reciprocating movement mechanism |
| 30 | Combination weighing apparatus |
| 30a-30d | Combination weighing apparatus |
| 31 | Weighing unit |
| 32 | Chute |
| 33 | Stock unit |
| 34 | Discharge unit |
| 35a-35c | Delivery unit |
| 36 | Pivot mechanism |
| 40 | Operation unit |
| 41 | Control unit |
| 50 | Combination weighing apparatus |
| 51 | Transport apparatus |
| 52 | Trough |
| 53a | First link |
| 53b | Second link |
| 61 | Reciprocating movement mechanism |
| 71 | Transport apparatus |
| 72 | Trough |
| 72a, 72b | Conical members |
| 73a | First link |
| 73b | Second link |
| 73aa | Tip member |
| 73bb | Tip member |
| 74 | Coupling member |
| 81 | Reciprocating movement mechanism |

DETAILED DESCRIPTION OF THE INVENTION

First Embodiment

<Entire Structure of the Transport Apparatus>

Figure 1:
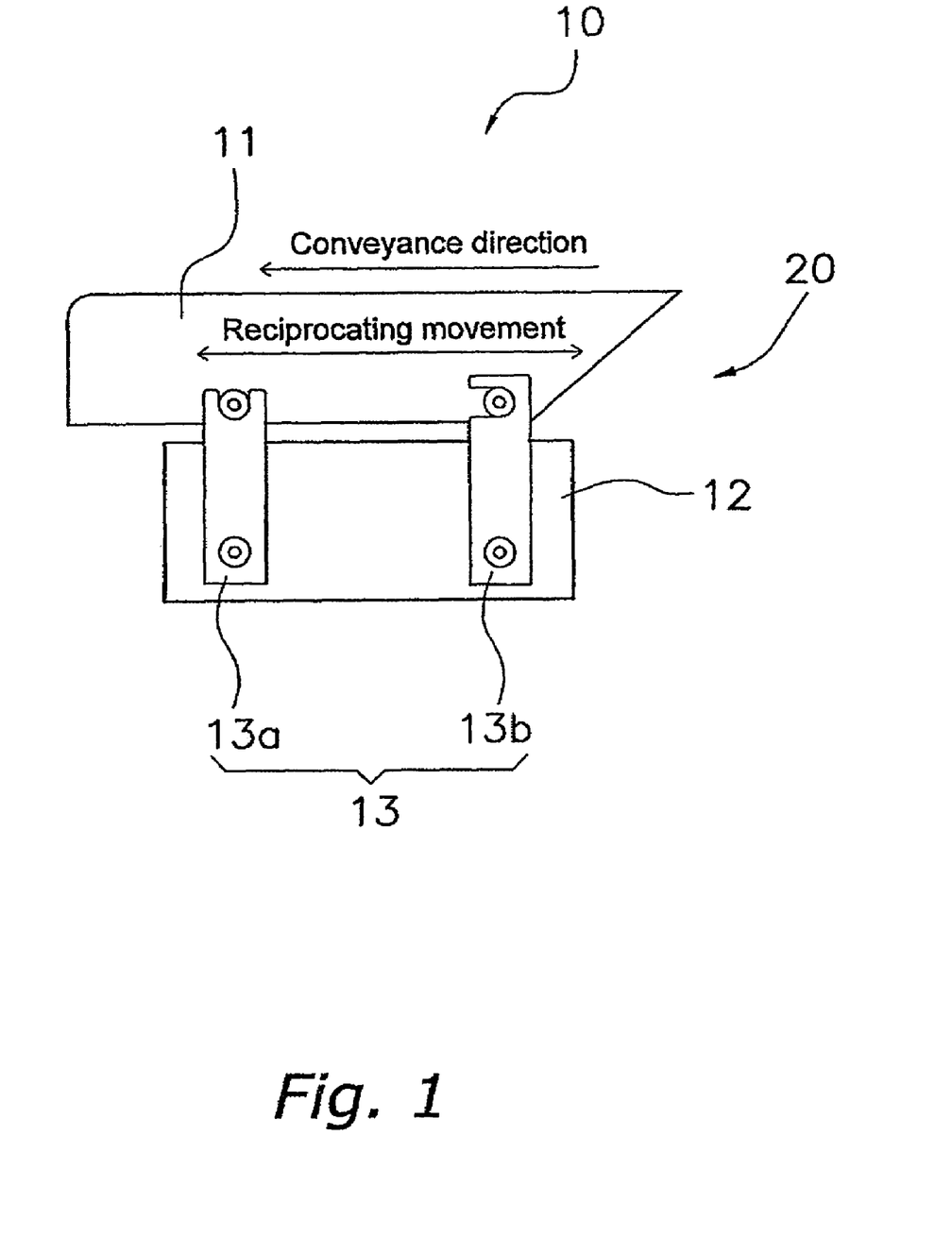
FIG. 1 is a lateral view of a transport apparatus according to an embodiment of the present invention.

A transport apparatus 10 according to an embodiment of the present invention is a transport apparatus that includes a trough 11 and a reciprocating movement mechanism 20 as shown in FIG. 1 and conveys an article placed in the trough 11 in a predetermined direction. The transport apparatus 10 conveys an article by reciprocating moving the trough 11 in the conveyance direction. In addition, with the transport apparatus 10, the reciprocating movement mechanism 20 reciprocating moves the trough 11 such that the movement in the direction opposite to the conveyance direction is faster than the movement in the conveyance direction. Consequently, when moving the trough 11 in a direction opposite to the conveyance direction, the transport apparatus 10 can convey an article placed in the trough 11 in the conveyance direction such that the article slides therein.

<Trough>

Figure 2:
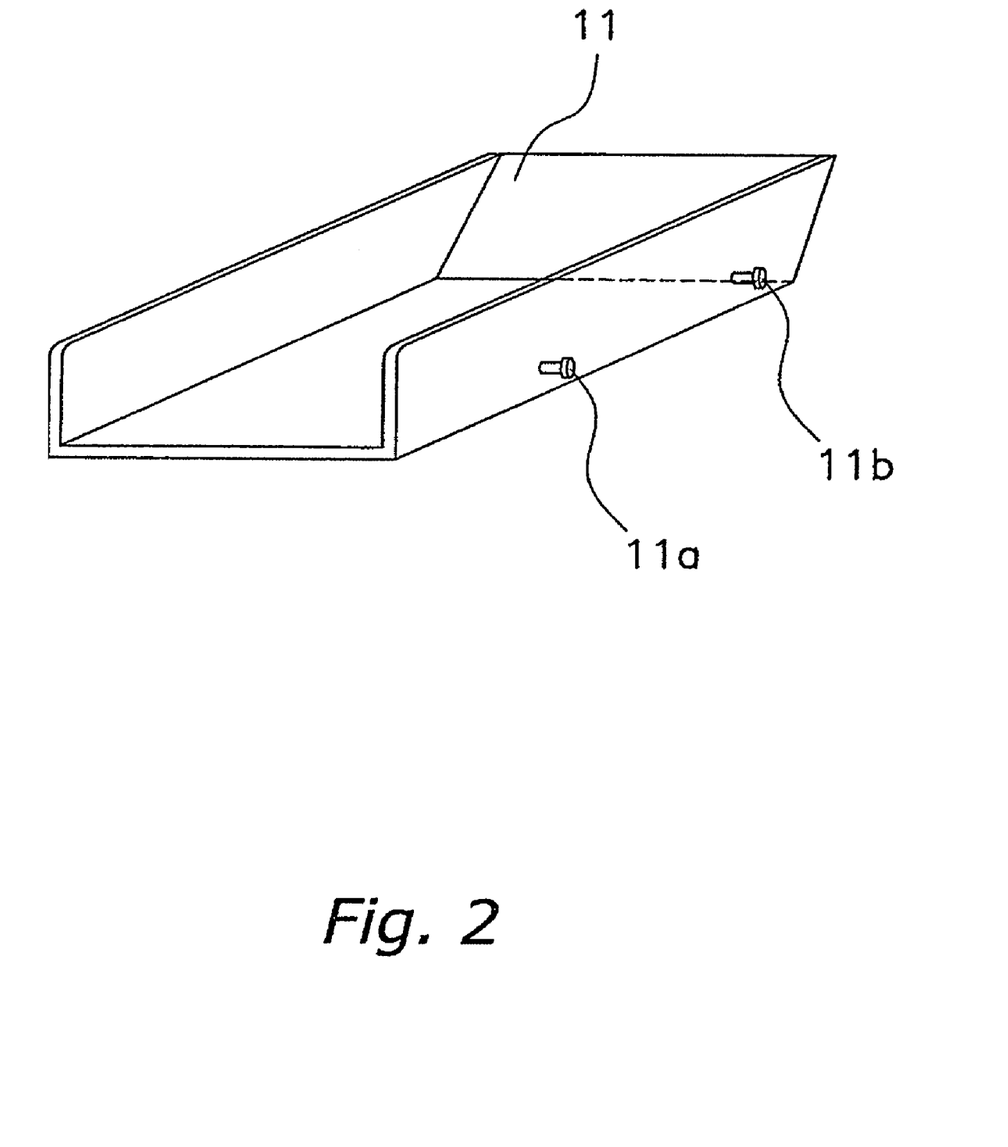
FIG. 2 is a perspective view of a trough included in the transport apparatus of FIG. 1.

The trough 11 is a tray-like member to place an article to be conveyed therein, and is disposed directly above a motor box 12. In addition, as shown in FIG. 2, the trough 11 has protruding parts 11a and 11b, which protrude from the lateral side of the trough 11. The protruding parts 11a and 11b are respectively held in a first depressed part 15a and a second depressed part 15b (refer to FIG. 4(a) and FIG. 4(b)), which are respectively formed at an end of a first link 13a and a second link 13b, which are described below. Consequently, the trough 11 is supported by the first link 13a and the second link 13b.

With the transport apparatus 10 of this embodiment, a rotary force of a rotation motor (rotary drive force) 14 inside the motor box 12 is transmitted to the trough 11 via a parallel link 13. At this time, the trough 11 performs reciprocating movement in the conveyance direction and conveys an article in a predetermined conveyance direction such that the article slides in the trough 11.

<Reciprocating Movement Mechanism 20>

The reciprocating movement mechanism 20 is a mechanism that performs conveyance by moving the trough 11 at higher speeds in a direction opposite to the conveyance direction (rearward movement) than in the conveyance direction. The reciprocating movement mechanism 20 comprises, as shown in FIG. 3(a) and FIG. 3(b), the motor box 12, the first link 13a, the second link 13b, a third link 13c (parallel link 13), and a linking member 16.

<Motor Box>

Figure 3:
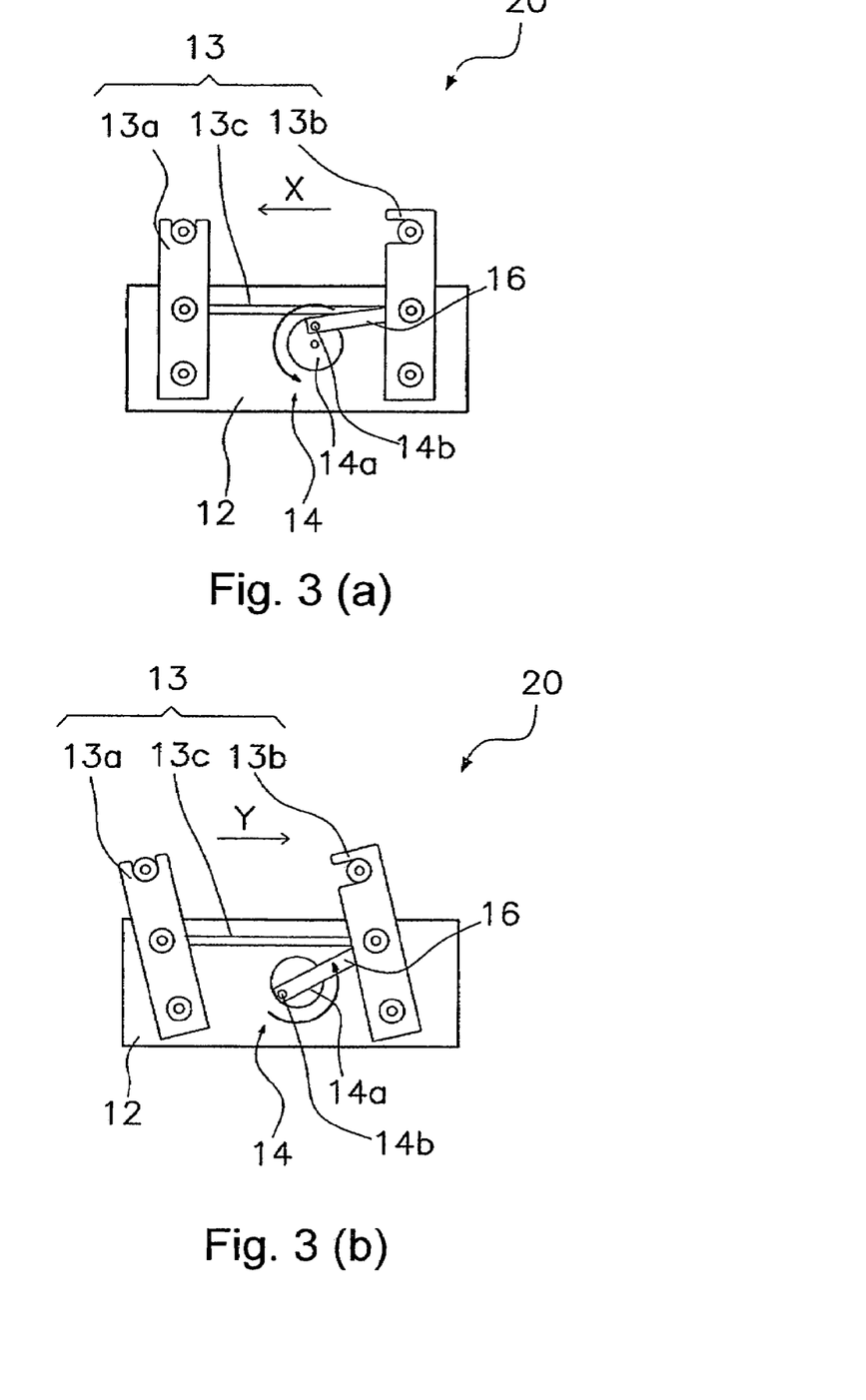
FIG. 3(a) and FIG. 3(b) are lateral views showing the movement of a parallel link and a linking member during conveyance.

As shown in FIG. 3(a) and FIG. 3(b), the motor box 12 includes the rotation motor (rotary drive force) 14 inside thereof. By rotating this rotation motor 14 in one direction, the motor box 12 oscillates the parallel link 13 (first link 13a, second link 13b, third link 13c) back and forth via the linking member 16 described below.

The rotation motor 14 is a stepping motor with a circular member 14a connected to the tip of the rotary shaft. The circular member 14a has a protruding part 14b at a position away from the center of rotation of the rotation motor 14. The protruding part 14b is configured such that one end thereof is connected to one end of the linking member 16 whose other end is connected to the second link 13b. In this way, simply by rotating the rotation motor 14 in one direction, the parallel link 13 can be oscillated back and forth. As a result, it becomes possible to reciprocating move the trough 11 connected to the parallel link 13.

In addition, when moving the trough 11 in the X direction shown in FIG. 3(a) (conveyance direction of an article), the rotation speed of the rotation motor 14 is controlled such that the trough 11 moves at lower speeds than when moving the trough 11 in the Y direction shown in FIG. 3(b) (direction opposite to the conveyance direction of an article). In other words, reciprocating movement of the trough 11 is performed such that the movement in the Y direction (rearward movement) is faster than the movement in the X direction (forward movement).

As described above, by reciprocating moving the trough 11 in the conveyance direction, it is possible to move an article placed in the trough 11 in a predetermined conveyance direction (X direction shown in FIG. 3(a)) such that the article slides in the trough 11, while accelerated velocity is imposed upon the article placed in the trough 11 in the forward conveyance direction.

It should be noted that in this embodiment, as shown in FIG. 1, the motor box 12 is disposed directly below the trough 11; however, the present invention is not limited to this. For example, the motor box 12 may be disposed on a side or behind the trough 11.

<Parallel Link>

The parallel link 13 includes the first link 13a, the second link 13b, and the third link 13c.

As shown in FIG. 3(a) and FIG. 3(b), the first link 13a is pivotably connected to one end of the third link 13c, and is pivotably connected to the lateral side of the motor box 12 at the bottom end. On the other hand, the second link 13b is pivotably connected to the other end of the third link 13c and the linking member 16, and is pivotably connected to the lateral side of the motor box 12 at the bottom end. In this way, when a drive force to rotate in one direction is transmitted to the parallel link 13 from the rotation motor 14 via the linking member 16, the parallel link 13 oscillates front and rear in the vertical plane around a position connected to the motor box 12.

Figure 4:
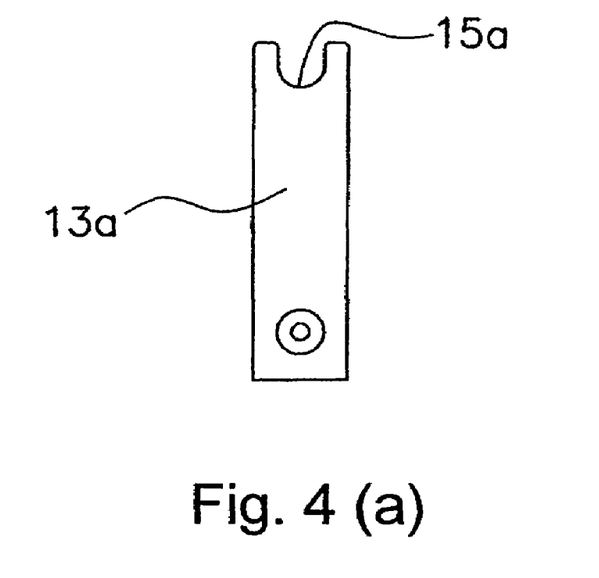
FIG. 4(a) and FIG. 4(b) are elevation views of two support members.

Further, the first link 13a is attached to the lateral sides of the trough 11 and the motor box 12 at a position shifted toward the conveyance direction, as compared to the second link 13b. In addition, as shown in FIG. 4(a), the first link 13a has the first depressed part 15a at one end. This first depressed part 15a is positioned such that the opening part faces vertically upward. Also, the first depressed part 15a holds the protruding part 11a of the trough 11 mentioned above.

The second link 13b is attached to the trough 11 and the motor box 12 at a position shifted toward an opposite side from the side for conveyance of an article, compared to the first link 13a. In addition, as shown in FIG. 4(b), the second link 13b has the second depressed part 15b at one end. This second depressed part 15b is positioned such that the opening part faces horizontally inward when viewed horizontally in the conveyance direction of an article, i.e., when viewed from the reciprocating movement mechanism 20. Also, the second depressed part 15b holds the other protruding part 11b of the trough 11 mentioned above.

As shown in FIG. 3(a) and FIG. 3(b), the third link 13c connects the first link 13a to the second link 13b. In this way, by oscillating the second link 13b connected to the linking member 16, the first link 13a can also be oscillated. As a result, the whole parallel link 13 can be oscillated.

It should be noted that the parallel link 13 is attached to the trough 11 at a position shifted toward the opposite direction from the conveyance direction, i.e., toward the back rather than the center part of the trough 11.

<Linking Member>

As shown in FIG. 3(a) and FIG. 3(b), the linking member 16 is connected to the parallel link 13 at one end, and is connected to the protruding part 14b of the circular member 14a of the rotation motor 14 at the other end. When the rotation motor 14 starts rotating, the circular member 14a rotates along with the protruding part 14b. At this time, since the linking member 16 connected to the protruding part 14b is pivot able around the protruding part 14b, when the rotation motor 14 rotates, it enables the parallel link 13 (second link 13b) connected to the other end of the linking member 16 to oscillate back and forth around a position connected to the motor box 12.

As described above, with the transport apparatus 10 of this embodiment, a rotary drive of the rotation motor 14 is not directly transmitted to the parallel link 13 but is transmitted via the linking member 16. In this way, it is possible to reciprocating move the trough 11 while rotating the rotation motor 14 in one direction, instead of rotating the rotation motor 14 in both the forward and reverse directions.

<Description of the Operation of the Transport Apparatus>

Here, a process to convey an article by the transport apparatus 10 of this embodiment is described.

First, when a user inputs a command to start conveyance, the rotation motor 14 starts rotating. Then, a rotary driving force of the rotation motor 14 is transmitted to the parallel link 13 (second link 13b) via the linking member 16, and consequently oscillating the parallel link 13 back and forth in the vertical plane. At this time, the parallel link 13 to be oscillated is connected to the lateral side of the trough 11, so that the trough 11 can be reciprocating moved back and forth in the conveyance direction.

Reciprocating movement of the trough 11 starts from a side opposite the predetermined conveyance direction, i.e., rearward side. Here, with the transport apparatus 10 that employs the reciprocating movement conveyance method as in the present embodiment, an article placed in the trough 11 is conveyed in the trough 11 during the reciprocating movement of the trough 11.

It should be noted, as mentioned above, during the reciprocating movement of the trough 11, that the movement in the direction opposite to the conveyance direction is performed faster than the movement in the conveyance direction. Consequently, it is possible to convey an article by imposing accelerated velocity upon the article in the forward conveyance direction while reciprocatingly moving the trough 11. Specifically, in the process in which the rotation motor 14 reciprocatingly moves the trough 11, the rotation speed is increased in a rotation range where the trough 11 is being moved in the direction opposite to the conveyance direction, as compared to the rotation speed with which the rotation motor 14 rotates while the trough 11 is moved in the conveyance direction. In this way, the trough 11 can be moved faster in the direction opposite to the predetermined conveyance direction than in the conveyance direction.

<Features of the Present Transport Apparatus>

(1)

With the transport apparatus 10 of this embodiment, the first link 13a and the second link 13b, which also function as the support members, respectively have the first depressed part 15a and the second depressed part 15b that are formed on one end thereof. Further, the first depressed part 15a and the second depressed part 15b support the protruding parts 11a and 11b protruding from the lateral side of the trough 11, and the trough 11 is configured such that it can be removed from the first link 13a and the second link 13b.

Note that, with a conventional transport apparatus such as a vibration feeder, in order to reliably transmit vibration from a vibration motor to a trough, a support member and the trough are rigidly connected to each other especially in the direction of the vector summation of the vertical direction and the conveyance direction.

On the contrary, the transport apparatus 10 of this embodiment has the reciprocating movement mechanism 20 and implements conveyance by the reciprocating movement conveyance method, in which vertical displacement of the trough 11 during conveyance is unlikely to occur and accelerated velocity in the vertical direction is small as compared to conveyance by a vibration feeder. Therefore, unlike the case with a vibration feeder, the support member does not need to be rigidly secured to the trough 11.

Consequently, with the transport apparatus 10 of this embodiment, the protruding parts 11a and 11b of the trough 11 are supported at the first depressed part 15a and the second depressed part 15b that are respectively formed at one end of the first link 13a and the second link 13b. In other words, the trough 11 is supported simply by placing the protruding parts 11a and 11b of the trough 11 in the first depressed part 15a and the second depressed part 15b of the first link 13a and the second link 13b.

Consequently, first, the protruding part 11b disposed rearward of the trough 11 is inserted to the second depressed part 15b whose opening part faces horizontally; then, the protruding part 11a on the front side of the trough 11 is simply inserted to the first depressed part 15a whose opening part faces vertically. In this way, the trough 11 can be easily mounted to the first link 13a and the second link 13b. On the contrary, when removing the trough 11 from the first link 13a and the second link 13b, the trough 11 can be easily removed simply by lifting the protruding part 11a on the front side of the trough 11 in a manner opposite to the abovementioned manner.

Therefore, according to the transport apparatus 10 of this embodiment, when removing the trough 11, a step for releasing a locking mechanism such as conventional vibration feeder becomes unnecessary. Therefore, removal of the trough 11 can be conducted more easily than before.

(2)

With the transport apparatus 10 of this embodiment, the trough 11 is supported by a combination of the first depressed part 15a facing vertically upward and the second depressed part 15b facing horizontally inward.

Consequently, it is possible to provide the transport apparatus 10 which enables the movement of the trough 11 to be controlled in the horizontal direction during conveyance with the conveyance method which reciprocating moves the trough 11, and which also enables an easy removal of the trough 11.

(3)

As shown in FIG. 4(b), with the transport apparatus 10 of this embodiment, the second link 13b as the support member is disposed such that the opening part of the second depressed part 15b faces horizontally inward when viewed from the trough 11.

In this way, when the trough 11 is reciprocating moving, vertical displacement of the trough II can be reliably controlled.

(4)

Figure 5:
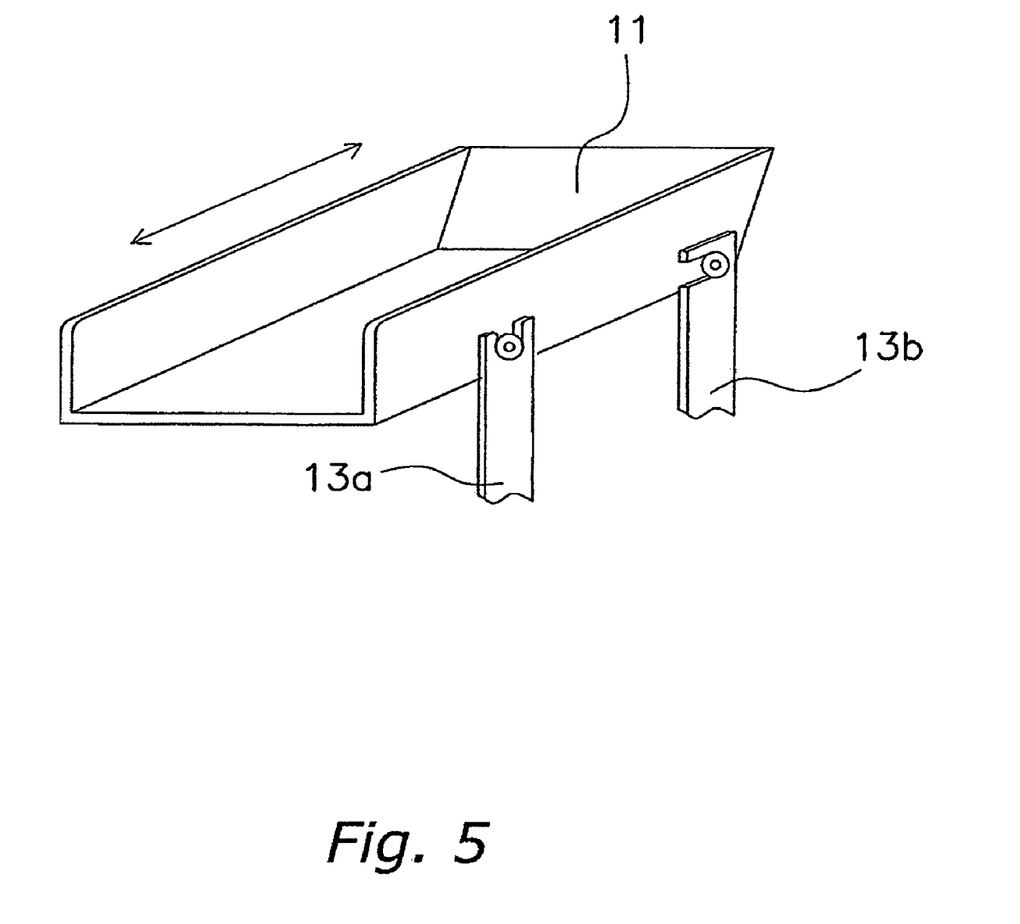
FIG. 5 is a view showing a cantilever-supported transport apparatus.

As shown in FIG. 5, the transport apparatus 10 of this embodiment is configured such that the parallel link 13 is attached to one lateral side of the trough 11.

In this way, by enabling reciprocating movement of the trough 11 with the use of the parallel link 13 coupled to one lateral side of the trough 11, the number of components needed for reciprocating movement of the trough 11 can be reduced. Therefore, the structure can be simplified, and improvement of clean ability can be achieved.

(5)

With the transport apparatus 10 of this embodiment, the trough 11 is supported by the parallel link 13 coupled to one lateral side of the trough 11.

In this way, by cantilever-supporting the trough 11, the structure can be simplified and removal of the trough 11 can be easily conducted. In addition, in comparison to a trough supported at both ends, the number of components for supporting the trough 11 can be reduced. Therefore, improvement of clean ability can be achieved.

It should be noted that, as described above, the transport apparatus 10 of this embodiment includes the reciprocating movement mechanism 20 and conveys an article by the reciprocating movement conveyance method. Therefore, in comparison to a conventional vibration feeder, it is not much needed for the trough 11 to be rigidly secured to the parallel link 13. Therefore, since a possibility of a problem such as the trough 11 becoming detached from the parallel link 13 during reciprocating movement is small, the cantilever support can be employed.

(6)

With the transport apparatus 10 of this embodiment, the parallel link 13 is attached to the lateral side of the trough 11 at a position shifted toward the opposite direction from the conveyance direction, i.e., toward the rear rather than the center part of the trough 11.

In this way, in view of the fact that the center of gravity of articles to be conveyed moves toward the rear of the trough 11 during conveyance, a driving force for conveyance can be efficiently transmitted to these articles by attaching the parallel link 13 at a position close to the center of gravity of these articles.

Second Embodiment

A combination weighing apparatus according to another embodiment of the present invention is described below in detail with reference to FIGS. 6 and 7.

Figure 6:
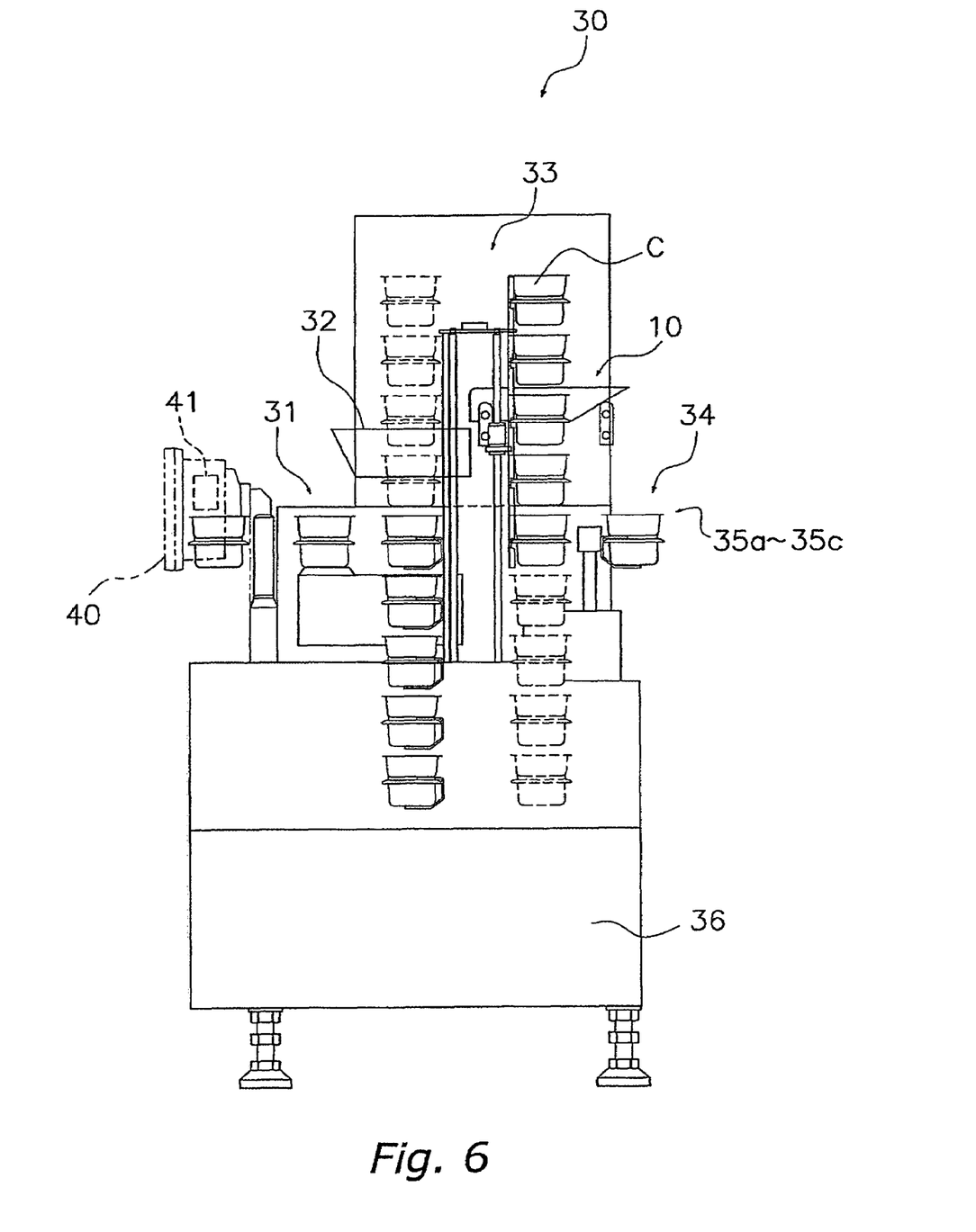
FIG. 6 is an elevation view of a combination weighing apparatus according to an embodiment of the present invention.
Figure 7:
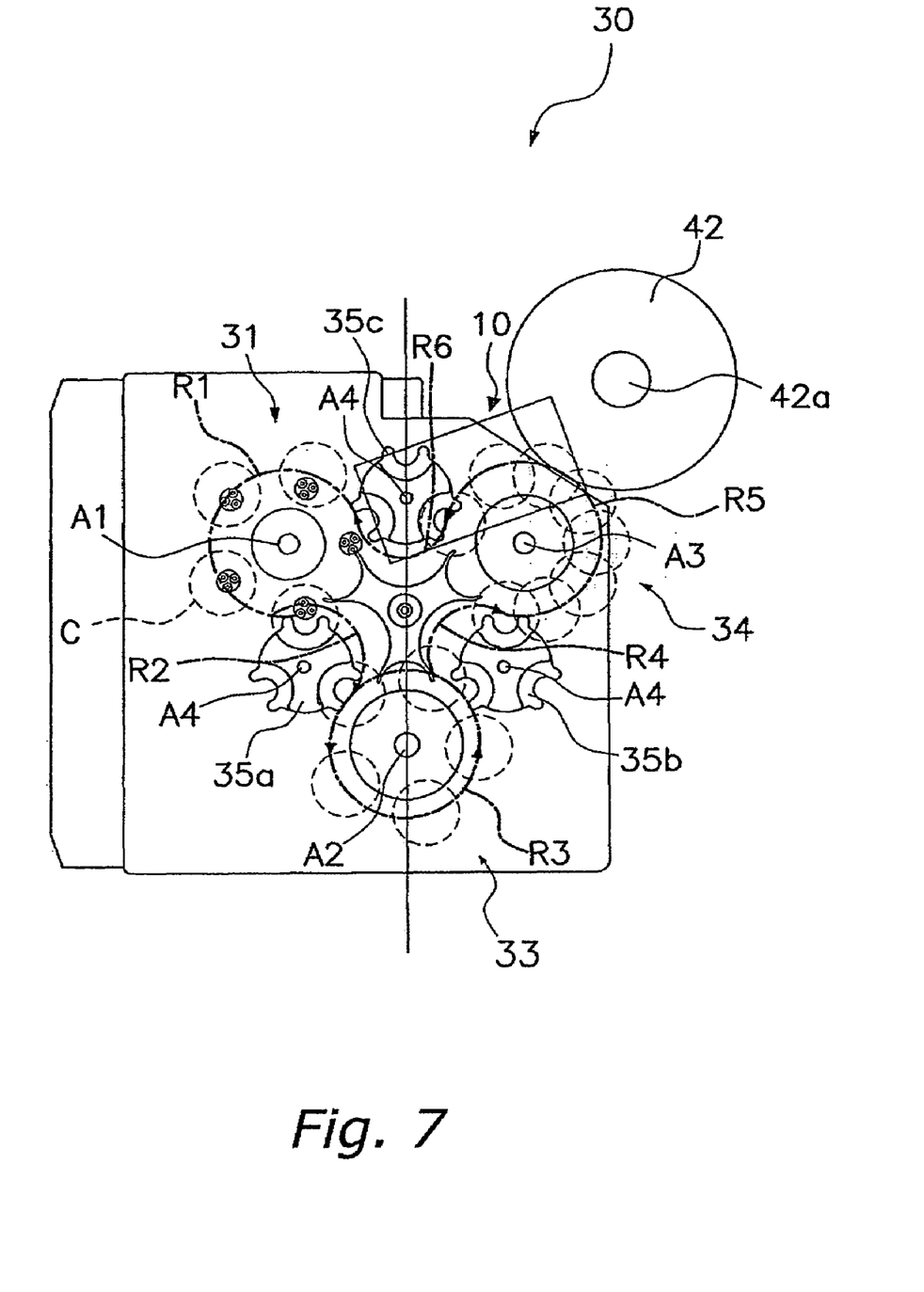
FIG. 7 is a plan view of the combination weighing apparatus of FIG. 6.

As shown in FIG. 6 and FIG. 7, the combination weighing apparatus 30 of this embodiment includes the transport apparatus 10 described in the first embodiment as a transport unit 10 that feeds a weighing unit 31 with a material subject to weighing. In addition, the combination weighing apparatus 30 is a combination weighing apparatus that implements processes from weighing to discharging while circulating containers C in which materials subject to weighing are placed. The combination weighing apparatus 30 includes the weighing unit 31, a stock unit 33, a discharge unit 34, delivery units 35a-35c, a turning mechanism 36, and an operation unit 40.

The container C is an open top, cup-shaped container with a brim around its periphery, and conveys a material subject to weighing from a feed position to a discharge position while circulating inside the combination weighing apparatus 30 In addition, the container C circulates inside the combination weighing apparatus 30 while constantly being moved through the weighing unit 31, the stock unit 33, and the discharge unit 34. Therefore, with the combination weighing apparatus 30 of this embodiment, all the processes such as feeding, weighing, stocking, and discharging of a material subject to weighing are performed while the material is carried by the container C. In addition, the container C is a member which is made of metal or partially made of metal, and it is held to the weighing unit 31, the stock unit 33, and the discharge unit 34 described below, by a magnetic force of a magnet attached to a holder that the weighing unit 31, the stock unit 33 and the discharge unit 34 each has.

The transport unit 10 is the transport apparatus described in the first embodiment, which drops a material to be weighed by the combination weighing apparatus 30 into a moving container C via a chute 32.

The weighing unit 31 includes a plurality of weighing machines, and weighs an empty container C that does not have a material subject to weighing inside and a container C that has a material subject to weighing inside.

The stock unit 33 stocks a plurality of containers C with materials that are already weighed by the weighing unit 31, and delivers a container C selected to be used for combination weighing to the discharge unit 34.

The discharge unit 34 inverts a desired container C selected among a plurality of containers C that are three-dimensionally stocked in the stock unit 33 so as to make the opening part of the container C face down while moving the container C toward the transport unit 10. In this way, a weighed material placed in the container C can be discharged at a desired location where a discharge chute 42 shown in FIG. 7 is disposed.

The delivery units 35a to 35c are provided between the weighing unit 31 and the stock unit 33, between the stock unit 33 and the discharge unit 34, and between the discharge unit 34 and the weighing unit 31, and deliver a container C between each unit.

The turning mechanism 36 synchronizes and rotates rotary shafts A1 to A4 of the abovementioned weighing unit 31, stock unit 33, and discharge unit 34. In this way, it is possible to smoothly deliver a container C through each of the units 31, 33, and 34.

The operation unit 40 receives an input regarding set values such as running speed from a user, and displays various information regarding operation and the like. It should be noted that, in this embodiment, a control unit 41 that controls the entire operation of the combination weighing apparatus 30 is provided inside the operation unit 40. In other words, the control unit 41 conducts combination weighing calculation based on the weight data obtained by the weighing unit 31 and selects containers C to be discharged from the discharge unit 34 based on the result of the combination weighing calculation.

The discharge chute 42 is a funnel-shaped member whose top and bottom parts are open, and has a lower opening part 42a. The discharge chute 42 is disposed adjacent to the discharge unit 34, and discharges from the lower opening part 42a a weighed material, which is discharged from a container C inverted by the discharge unit 34.

In addition, with the combination weighing apparatus 30 of this embodiment, as shown in FIG. 7, a feeding and weighing zone R1, a container delivery zone R2, a stock zone R3, a container delivery zone R4, a discharge zone R5, and a container delivery zone R6 are formed along a path of movement of a container C. The container C moves in an ascending order from the zone R1 to the zone R6 to circulate inside the combination weighing apparatus 30. It should be noted that the dashed line shown in FIG. 7 indicates the loci of the centers of the containers C as they circulate.

The feeding and weighing zone R1 is a section in the weighing unit 31, where a material subject to weighing is fed to a container C and the container C and the material subject to weighing are weighed. Here, an empty container C is weighed first. Then, a material subject to weighing is dropped into the container C, and the container C with the material subject to weighing inside is weighed. The container delivery zone R2 is a section in the delivery unit 35a, where the weighed container C is received from the weighing unit 31 and is delivered to the stock unit 33. The stock zone R3 is a section where the container C is received from the delivery unit 35a and is stocked three-dimensionally in the stock unit 33. Here, a plurality of containers C that are already weighed are three-dimensionally stocked, and these plurality of containers C are circulated inside the stock unit 33. The container delivery zone R4 is a section where a container C selected by the control unit 40 among the plurality of containers C stocked in the stock unit 33 is received and delivered to the discharge unit 34. The discharge zone R5 is a section where the container C received from the delivery unit 35b is inverted while being turned around, and the weighed material is discharged to the lower opening part 42a of the discharge chute 42 as an intended discharge position. The container delivery zone R6 is a section where the container C that became empty because the weighed material was discharged is received from the discharge unit 34 and is delivered back to the weighing unit 31.

The combination weighing apparatus 30 of this embodiment is configured such that a container C circulates inside the combination weighing apparatus 30 along each of the zones R1 to R6 as described above. By continuously discharging weighed materials of intended weight, it is possible to conduct combination weighing.

<Features of the Combination Weighing Apparatus>

The combination weighing apparatus 30 of this embodiment includes the transport apparatus 10 of the first embodiment described above as a transport unit to feed a material subject to weighing to a container C that is circularly moving.

Consequently, it is possible to provide the combination weighing apparatus 30 that enables an easy removal of the trough 11. Besides the effect mentioned above, it is possible to attain all the effects that can be attained by the transport apparatus 10 of the first embodiment.

Other Embodiments

While only one embodiment of the present invention is described, the scope of the invention is not limited to the above-described embodiment, and various changes and modifications can be made herein without departing from the scope of the invention.

(A)

The first embodiment is described using an example in which the first depressed part 15a and the second depressed part 15b formed in the first link 13a and the second link 13b are arranged such that they respectively face vertically upward and horizontally inward. However, the present invention is not limited to this case.

Figure 9:
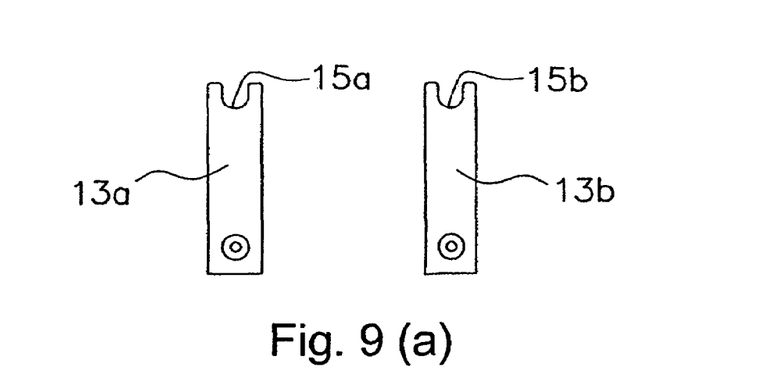
FIG. 9 shows lateral views of examples of combinations of a first link and a second link.

For example, all the depressed parts 15a and 15b may face vertically upward as shown in FIG. 9(a), or all the depressed parts 15a and 15b may face horizontally inward as shown in FIG. 9(b). Also as for the horizontal direction, as shown in FIG. 9(c) and FIG. 9(d), the depressed parts 15a and 15b may face toward the conveyance direction or the opposite direction.

However, as shown in FIG. 9(a), in the case where all the depressed parts 15a and 15b face vertically upwards, the trough 11 can be removed further easily.

(B)

The first embodiment is described using an example in which the trough 11 is cantilever-supported at one lateral side of the trough 11. However, the present invention is not limited to this case. For example, the trough 11 can be supported at both ends, such that the trough 11 is supported at both lateral sides. By supporting at both ends, the trough 11 can be stably supported. However, in terms of an easy removal of the trough 11 and improvement of its clean ability, it is preferable that the trough 11 is cantilever-supported as in the first embodiment.

(C)

The first embodiment is described using an example in which the parallel link 13 that reciprocating moves the trough 11 also functions as a support member for the trough 11. However, the present invention is not limited to this case. For example, separately from the parallel link 13, a support member for the trough 11 can be provided. However, also in this case, in terms of an easy removal of the trough 11 and improvement of its clean ability, it is preferable that there are fewer components to be connected to the trough 11. Therefore, as in the above embodiment, it is more preferable that the parallel link 13 is used as a support member.

(D)

The first embodiment is described using an example in which a stepping motor is used for the rotation motor 14 as a rotary drive source for reciprocating moving the trough 11. However, the present invention is not limited to this case. It is possible to use another rotary drive source such as a servo motor.

(E)

Figure 8:
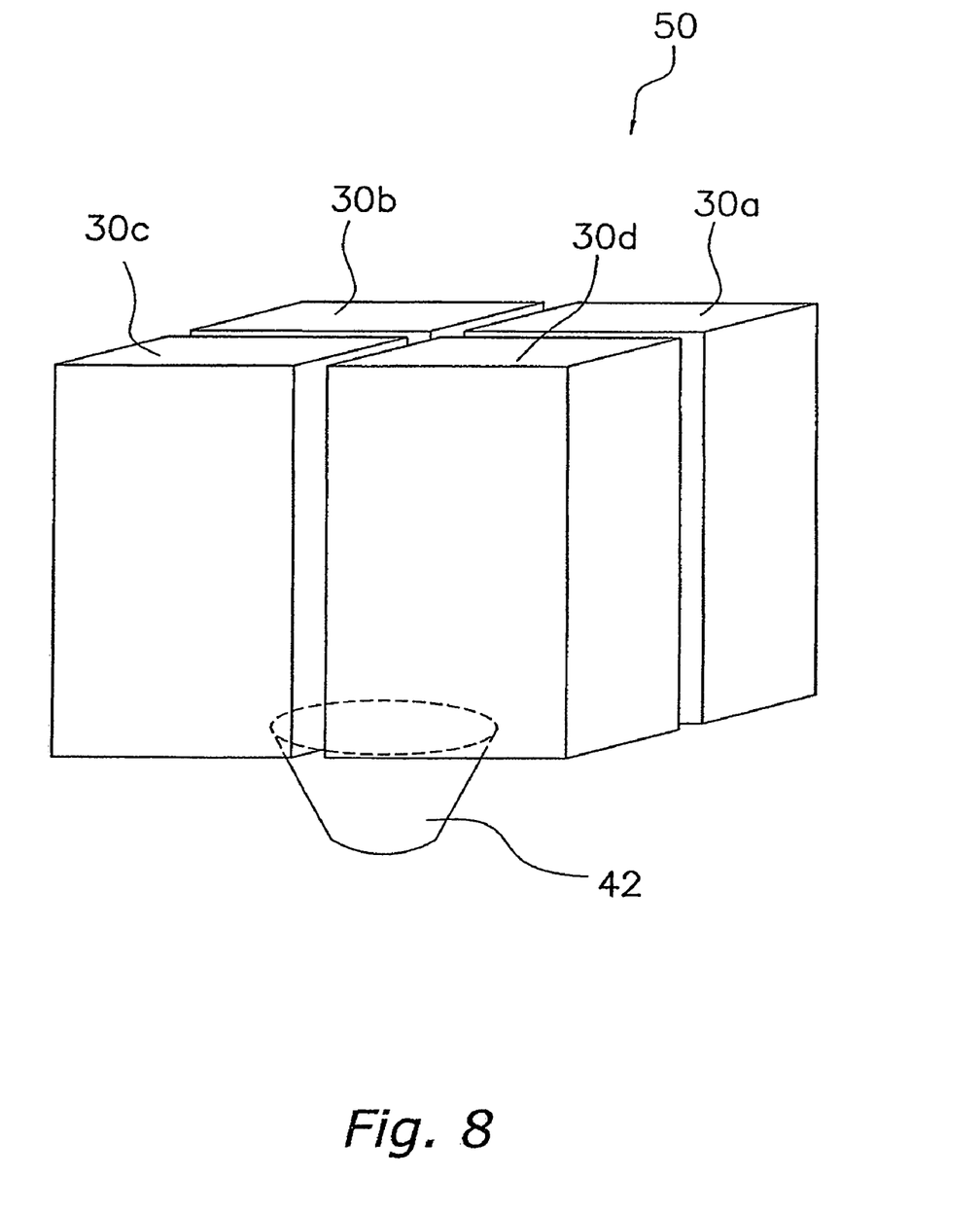
FIG. 8 is a schematic view of a combination weighing apparatus according to another embodiment of the present invention.

The second embodiment is described using an example in which combination weighing is conducted using the single-unit weighing apparatus 30. However, the present invention is not limited to this case. For example, as shown in FIG. 8, a combination weighing apparatus 50 which combines a plurality of combination weighing apparatuses 30 described in the second embodiment may be used to conduct combination weighing. In the case where the combination weighing apparatus 50 as shown in FIG. 8 is configured, materials subject to weighing can be substantially simultaneously fed to the discharge chute 42 from four combination weighing apparatuses 30a to 30d. Therefore, speedup in combination weighing can be achieved.

(F)

The above embodiment is described using an example in which the first and second links 11a and 11b are coupled to the lateral side of the trough 11 in order to reciprocating move the trough 11. However, the present invention is not limited to this case.

Figure 10:
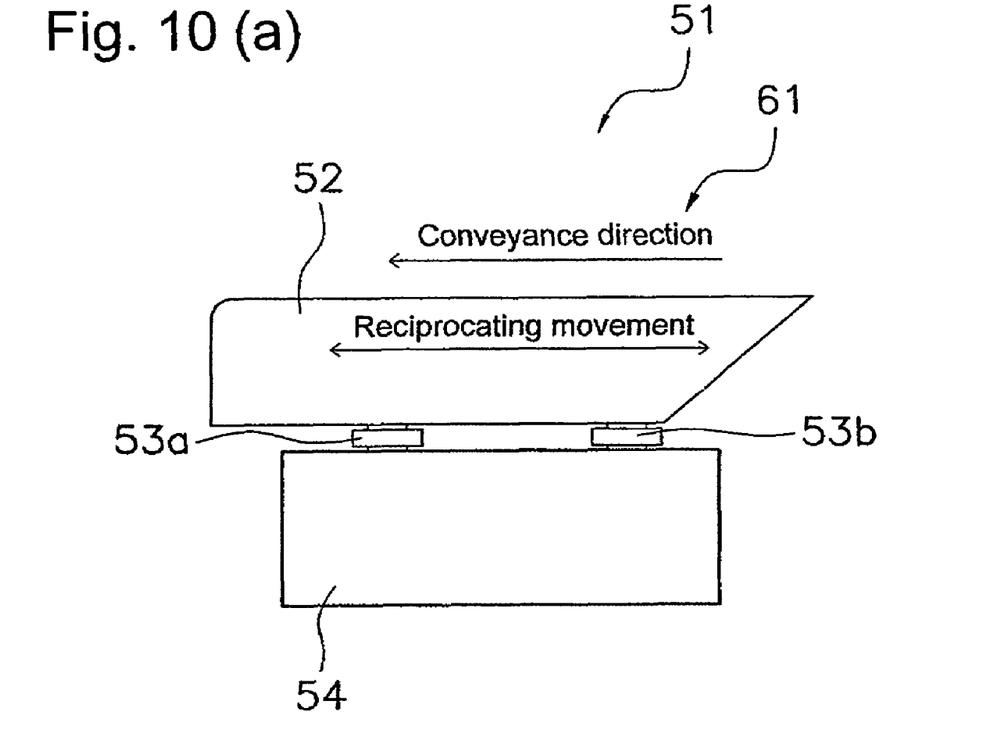
FIG. 10(a) and FIG. 10(b) are schematic views of a transport apparatus according to yet another embodiment of the present invention.

For example, as shown in FIG. 10(a) and FIG. 10(b), the present invention may be a transport apparatus 51 in which a first link 53a and a second link 53b are coupled to the underside of a trough 52, and which has a reciprocating movement mechanism 61 that reciprocating moves the trough 52 by a rotation motor housed in a motor box 54.

(G)

The above embodiment is described using an example in which the depressed parts 15a and 15b of the first link 11a and the second link 11b coupled to the lateral side of the trough 11 are corresponding in size to the protruding parts 11a and 11b of the trough 11. However, the present invention is not limited to this case.

Figure 11:
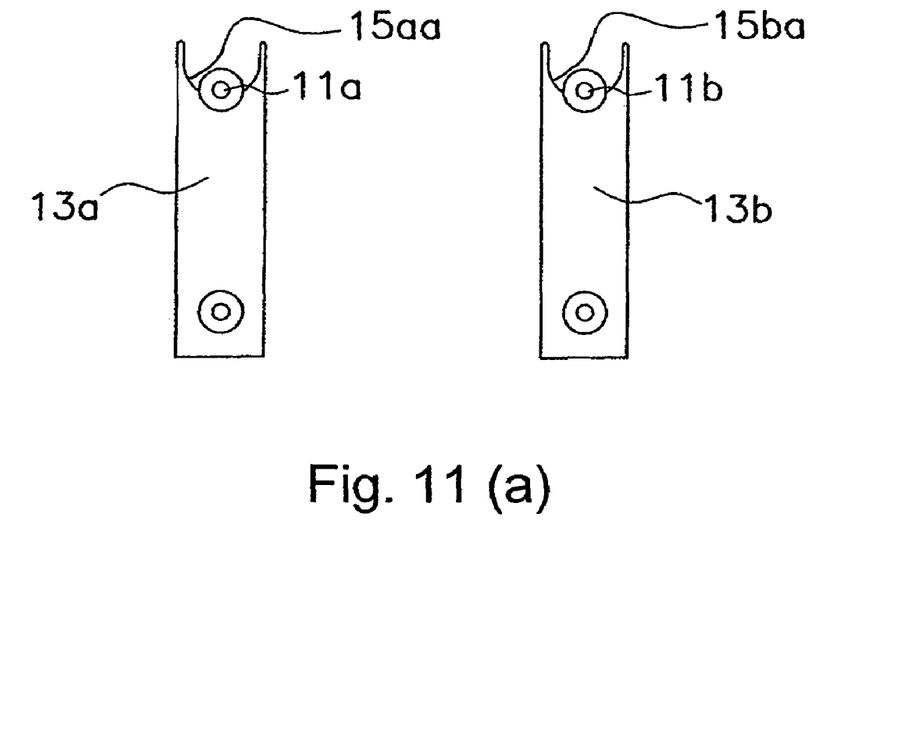
FIG. 11(a) and FIG. 11(b) are lateral views of different structures of the first link and the second link.

For example, as shown in FIG. 11(a) and FIG. 11(b), depressed parts 15aa and 15ba that are bigger than the protruding parts 11a and 11b of the trough 11, or V-shaped depressed parts 15ab and 15bb can be used. When the first link 13a and the second link 13b with such depressed parts formed therein are used, removal of the trough 11 becomes even easier since the protruding parts 11a and 11b are simply placed in the depressed parts.

(H)

The above embodiment is described using an example in which the transport apparatus 10 includes the reciprocating movement mechanism 20 in which the first link 13a and the second link 13b are coupled to the protruding parts 11a and 11b that protrude from the lateral side of the trough 11. However, the present invention is not limited to this case.

Figure 12:
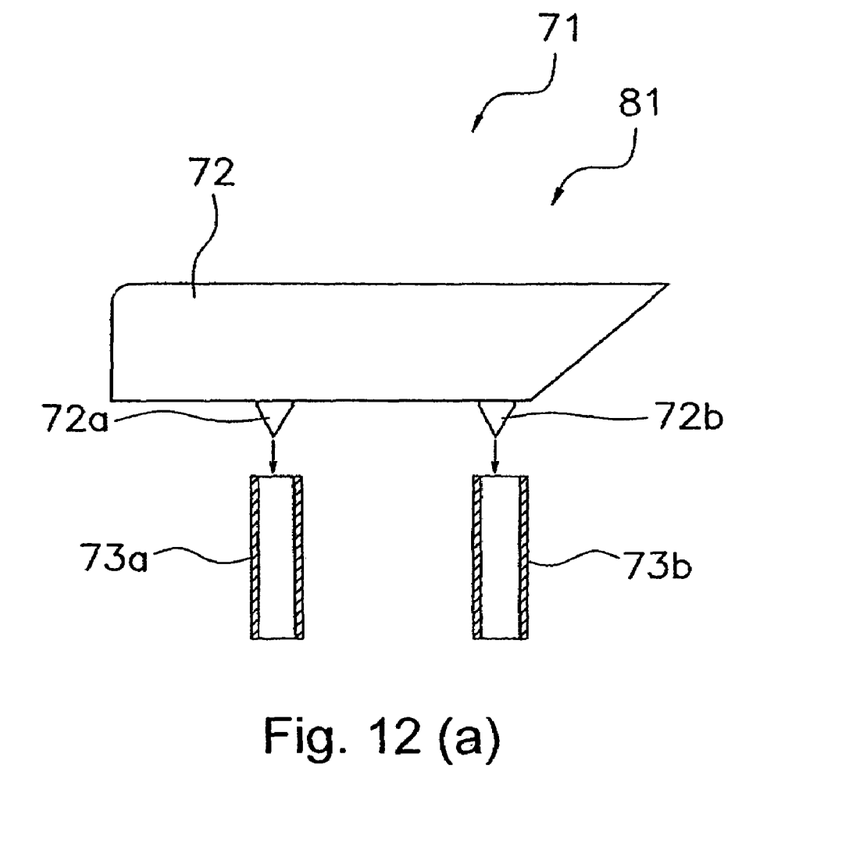
FIG. 12(a) and FIG. 12(b) are schematic views of a transport apparatus according to yet another embodiment of the present invention.

For example, as shown in FIG. 12(a), it may be a transport apparatus 71 that has a reciprocating movement mechanism 81 which reciprocating moves a trough 72 by using cylindrical members of substantially 20 mm internal diameter as a first link 73a and a second link 73b, and inserting pointed ends of conical members 72a and 72b of substantially 21 mm base diameter and substantially 50 mm in height protruding from the underside of the trough 72 into the first and second links 73a and 73b of cylindrical shape.

In addition, as shown in FIG. 12(b), it is also possible to use a reciprocating movement mechanism in which cylindrical tip members 73aa and 73bb pivot with respect to the first and second links 73a and 73b that are mutually coupled by a coupling rod 74, and in which the cylindrical tip members 73aa and 73bb are attached such that the opening parts thereof always face vertically upward. In this case, the tip members 73aa and 73bb that support the conical members 72a and 72b that protrude from the underside of the trough 72 are disposed such that their opening parts always face vertically upwards, so that it is possible to prevent the trough 72 from becoming detached from the first link 73a and the second link 73b during operation of the apparatus.

In addition, in both cases as shown in FIG. 12(a) and FIG. 12(b), the trough 72 can be installed simply by placing the trough 72 on the first link 73a and the second link 73b, so that removal of the trough 72 can be easily conducted.

INDUSTRIAL APPLICABILITY

The present invention accomplishes the effect of significantly easy removal of a trough. Therefore, the present invention is applicable to various transport apparatuses that performs conveyance using a trough.

The invention claimed is:

1. A transport apparatus adapted to convey an article in a predetermined conveyance direction, comprising:
   a trough in which the article to be conveyed is adapted to be placed, the trough including one of a first protruding part and a depressed part; and
   a reciprocating movement mechanism having a rotation motor and first and second support member to support the trough with the first and second support members being spaced apart in the predetermined conveyance direction, the rotation motor being operatively coupled to the first and second support members to transmit a rotary force in one rotational direction to pivotally move the first and second members while the first and second members are maintained parallel to each other to reciprocatingly move the trough via pivoting movements of the first and second support members along the conveyance direction of the article such that a movement of the trough in a direction opposite the conveyance direction is faster than a movement in the conveyance direction, at least one of the first and second support members of the parallel link including the other of the first protruding part and the depressed part,
   the first protruding part being removably connected to the depressed part.

2. The transport apparatus according to claim 1, wherein the at least one of the first and second support members of the parallel link has the depressed part that faces vertically upward.

3. The transport apparatus according to claim 1, wherein the first protruding part is provided on an underside surface of the trough.

4. A combination weighing apparatus, comprising:
   the transport apparatus according to claim 1;
   a weighing unit configured to weigh material fed by the transport apparatus;
   a stock unit configured to store the material weighed by the weighing unit;
   a control unit operatively coupled to the weighing unit and the stock unit to conduct combination weighing and select material to be discharged; and
   a discharge unit configured to discharge the material selected by the control unit.

5. The transport apparatus according to claim 1, wherein the trough has the first protruding part and a second protruding part, and
   the first support member has the depressed part removably connected to the first protruding part and the second support member has a depressed part that is removably connected to the second protruding part.

6. The transport apparatus according to claim 5, wherein:
   at least one of the first and second support members has the depressed part that faces horizontally.

7. The transport apparatus according to claim 6, wherein the second support member has the depressed part facing horizontally, and is located at a position shifted in the direction opposite the conveyance direction relative to the first support member, and
   the depressed part of the second support member faces the conveyance direction.

8. The transport apparatus according to claim 5, wherein the first and second protruding parts are provided on only one lateral side of the trough.

9. The transport apparatus according to claim 5, wherein a conveyance direction center of the first and second support members is shifted in the direction opposite the conveyance direction relative to a conveyance direction center of the trough.

10. The transport apparatus according to claim 6, wherein at least one of the first and second support members has the depressed part that faces vertically 11. The transport apparatus according to claim 6, wherein both of the first and second support members have the depressed part that faces horizontally.

12. The transport apparatus according to claim 7, wherein the depressed part of the first support member faces horizontally in the direction opposite the conveyance direction.

13. The transport apparatus according to claim 5, wherein both of the first and second support members have the depressed part that faces vertically.

14. The transport apparatus according to claim 5, wherein both of the first and second protruding parts are provided on an underside surface of the trough.

15. The transport apparatus according to claim 1, wherein the depressed part and the first protruding part are corresponding in size.

* * * * *